(12) United States Patent
Rodyushkin et al.

(10) Patent No.: US 8,548,776 B2
(45) Date of Patent: Oct. 1, 2013

(54) PARALLEL PHYSICS SOLVER

(75) Inventors: Konstantin Rodyushkin, Nizhny Novgorod (RU); Sergey Lyalin, Nizhni Novgorod (RU)

(73) Assignee: Intel Corporation, Santa Clara, CA (US)

( * ) Notice: Subject to any disclaimer, the term of this patent is extended or adjusted under 35 U.S.C. 154(b) by 1090 days.

(21) Appl. No.: 12/215,901

(22) Filed: Jun. 30, 2008

(65) Prior Publication Data

US 2009/0326880 A1    Dec. 31, 2009

(51) Int. Cl.
    *G06F 17/10*    (2006.01)

(52) U.S. Cl.
    USPC .................................................. 703/2; 703/6

(58) Field of Classification Search
    CPC ................................................. G06F 17/5018
    USPC ............... 703/2, 6; 345/418, 419, 420, 501, 345/502, 505; 708/490, 520
    See application file for complete search history.

(56) References Cited

PUBLICATIONS

Brian Mirtich. Rigid body contact: Collision detection to force computation. Technical Report TR-98-01, Mitsubishi Electrical Research Laboratory,1998.*

Allen, J. G. and Jin, J. S., (2001): Enhancing Screen Teleconferencing with Streaming SIMD Extensions. Pan-Sydney Workshop on Visual Information Processing, Sydney, Australia, 11: 143-149, ACS.*
Bolz J., Farmer I., Grinspun E., Schröder P.: Sparse matrix solvers on the GPU: Conjugate gradients and multigrid. ACM Trans. Graph. (Proceedings of ACM SIGGRAPH) 22(3). 917-924, Jul. 2003.*
Buatois L., Caumon2 G, Lévy B., "Concurrent No. Cruncher: An Efficient Sparse Linear Solver on the GPU", Proceedings of High Performance Computation Conference, 2007, pp. 358-371.*
Christian Thompson, Building a 2D Physics Engine for MASON, Oct. 22, 2007, created 2005, available on the internet at least on Oct. 22, 2007 from http://cs.gmu.edu/~eclab/projects/mason/extensions/physics2d/, 25 pages.*
Sogn Ho Ahn, Data Alignment, 2005, retreived from http://www.songho.ca/misc/alignment/dataalign.html on May 15, 2012, 4 pages.*
E. Larsen. A robot soccer simulator: A case study for rigid body contact. Game Developers Conference, 2001, 21 pages.

* cited by examiner

*Primary Examiner* — Kamini S Shah
*Assistant Examiner* — Luke Osborne
(74) *Attorney, Agent, or Firm* — Trop, Pruner & Hu, P.C.

(57) ABSTRACT

A parallel physics solver may solve an equation to determine the characteristics of motion after a collision. In some embodiments, the physics solver solves the equation AX=B, where A is a sparse constrained matrix and B is the right hand vector. The sparse constrained matrix may be formed of 6×K blocks, where K is a tuning parameter that divides into the width of a single instruction multiple data processor used to implement the physics solver, without residue.

20 Claims, 1 Drawing Sheet

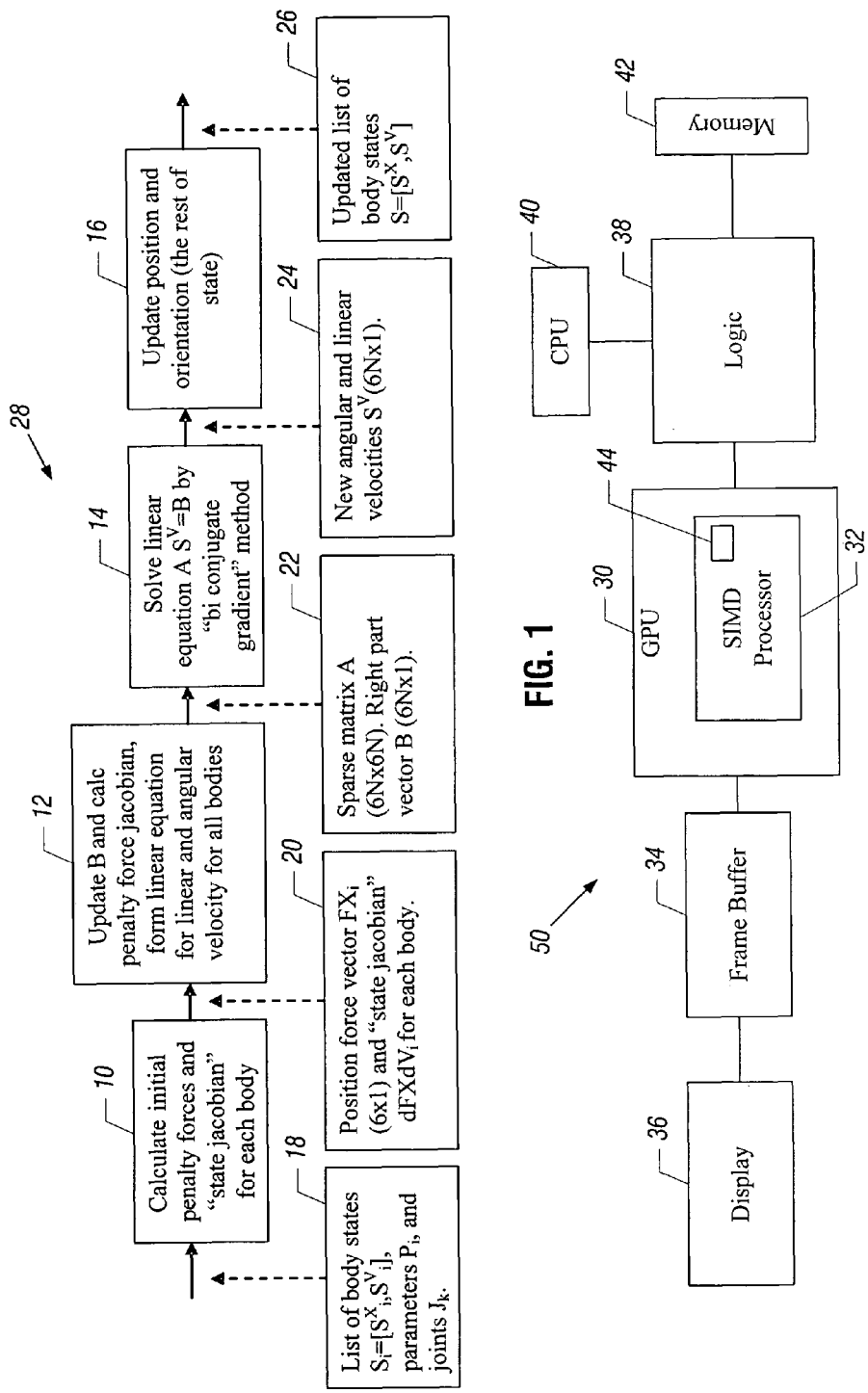

PARALLEL PHYSICS SOLVER

BACKGROUND

This relates generally to physics simulations for scientific and game applications, for example.

A physics simulation may be implemented by a graphics processor. It provides a solution that indicates the movement two bodies take after a collision. Thus, two bodies can be depicted as moving in a given direction with a given velocity. When they collide, the physics solver indicates how they move after the collision.

A penalty based solver calculates new states for N bodies for each successive time step, given parameters for each of the bodies, the body's current states and a list of M joints. A body state is a list of rigid body characteristics that changes over time. The body characteristics may include body position, body orientation, linear body velocity, and angular body velocity, as examples. The body parameters are body characteristics that do not change over time. The body parameters may include body mass and body inertia tensor. The joint list is a list of body pairs that come into contact with information about each contact, including the contact point coordinates and contact normal vector.

The penalty based solver effectively analyzes body motion after a collision. The solver simulates the collision by adding artificial springs between the colliding bodies to avoid body penetration.

BRIEF DESCRIPTION OF THE DRAWINGS

FIG. 1 is a depiction of a penalty based solver pipeline in accordance with one embodiment of the present invention; and FIG. 2 is a schematic system depiction for one embodiment.

DETAILED DESCRIPTION

The physics solver pipeline 28, shown in FIG. 1, includes four stages. In one embodiment, the pipeline 28 may implement a penalty based physics solver. The pipeline 28 analyzes N bodies which may be moveable graphic images that may collide, for example, in a video game.

The first stage 10 scans all N bodies and calculates initial position force vectors $F_i$ for each body and the so-called state Jacobian matrix $dFX/dV_i$. The input 18, for the first stage, is a list of body states $S_i=[S_i^X,S_i^V]$, parameters $P_i$, and joints $J_k$.

The second stage 12 scans all joints and forms a left hand part, called a collision matrix or a sparse constrained matrix A and a right hand part (RHP) vector B using the position force vector $Fx_i$, for example, a 6×1 matrix, and state Jacobian (dFX/dV), for example, a 7×6 matrix, for each body, calculated in stage 10. The vector FX may be a 7×1 vector, in one embodiment, calculated from the current state of a body $S=[S^V, S^X]$ and body parameters P, such as inertia, tensor, and mass. The FX vector describes the influence on body position and orientation of its current velocity. The state Jacobian matrix dFX/dV describes derivatives of the FX vector by velocity parameters. The sparse constrained matrix A and right hand part vector B are known in the art. For each time interation of the physics solver pipeline 28, which may correspond to frames of video, the linear sparse constraint matrix equation AX=B is solved. The sparse constraint matrix A may be a 6N×6N matrix, in one embodiment, where N is the number of bodies in a system.

The sparse constrained matrix A has many zero elements, which is why it is called the "sparse" constrained matrix. The sparse constrained matrix A may be divided into N×N blocks, where each block is a 6×6 matrix in one embodiment. In the sparse constrained matrix A, only diagonal blocks and blocks corresponding to collided bodies are not equal to zero. For example, if bodies i and j collide, then blocks (i, j) and (j, i) in the sparse constrained matrix A are not zero.

The right hand part vector B may be a 6N×1 vector in one embodiment. The right hand part vector B describes forces that apply to each body.

The vector X is unknown and is found by solving the sparse constraint matrix equation. The vector X can be considered a set of N vectors $S_V.X=[S^V_1, S^V_2, \ldots, S^V_N]$, where each vector $S^V$ may be a 6×1 vector that describes the velocity state of each body in the system. The first three of six elements of the 6×1 vector $S^V$ may be linear velocities of the gravity center of the body. The second three elements may describe the rotation direction and velocity around the body gravity center.

The physics solver pipeline forms the sparse constrained matrix A and the right hand part vector B, solves the equation AX=B, and then updates the body position state $S^X_i$ with the new velocity state $S^V_i$. The position state $S^X$ may be a 7×1 vector that describes the body gravity center position and body orientation.

The second stage (block 12) forms the linear equation by dividing all N bodies in the system into batches for parallel processing. Each batch is processed independently by a separate thread. For each body, the vector FX and state Jacobian matrix dFX/dV, calculated in stage 10, are used.

The second stage 12 uses the position force vector $Fx_i$ and state Jacobian matrix $dFx/dV_i$ for each body (block 20) to update the right hand part vector B and to calculate pentalty force Jacobian. It also uses the linear equation (AX=B or AS=B) to determine the linear and angular velocity of all bodies.

The third stage 14 solves the linear equation using the bi-conjugate gradient method. See R. Barrett, M. Barry, T. F. Chan, J. Demmel, J. Donato, J. Dongarra, V. Eijkhout, R. Pozo, C. Romine, and H. V. der Vorst, Templates for the Solution of Linear Systems: Building Blocks for Iterative Methods, Second Edition, SIAM, Philadelphia, Pa., 1994. The sparse constraint matrix A and right hand part vector B (block 22) from stage 12 are used.

The linear equation solution stage 14 usually involves only forces produced by the artificial springs between bodies. But suppose that there are not any forces, except forces from the string between a body pair. In case of a large system using single precision arithmetic calculations, such a situation can lead to instability and increasing energy of all the bodies in the system. The result may look like the explosion of the bodies. To avoid this result, dissipative forces can be added to the spring simulation to dissipate extra energy.

The first added force may be friction between bodies that happens during the body collision and has a tangent direction relative to the collision normal. This may enable computer calculations to use single precision arithmetic without decreasing solution stability in some embodiments. The second added force may be the viscosity friction that is proportional to the penetration of velocity and has a direction along a collision normal. These force additions allow more stable penalty based method without bodies exploding. The addition for the vector B is two 6×1 vectors and the addition for the matrix A is four 6×6 matrices in some embodiments.

In accordance with one embodiment, the matrix A is formed of 6×K blocks. K integrally divides into the width of single instruction multiple data processors used to implement the physics solver without a remainder, that is, the result of the division is an integer. This value of K is an array of floating point numbers containing K elements and equals one cache line for the target processor, such as a central processing unit or graphics processing unit. These conditions on K enable efficient utilization of both single instruction multiple data units of processors and processor caches in some embodiments.

After the third stage is finished, new velocities are calculated for all bodies in the fourth stage 16. The fourth stage 16 scans all N bodies and calculates new positions and orientations for each body. The fourth stage also updates the body state vectors. The fourth stage receives new angular and linear velocities ($S^V$) for each body (block 24) and outputs an updated list of body states $S=[S^X, S^V]$ (block 26).

In the fourth stage 16, the body positions and orientations are updated using the new velocity states. Again, all the bodies are divided into batches, as before, for independent parallel processing. Each thread processes its own batch independently, as was the case previously.

In some embodiments, calculating position force vectors, calculating a state matrix, solving a system of linear equations, and updating body monitors are performed independently in multiple threads of execution, each thread of execution operating on a separate set of bodies. In some embodiments, a collision matrix is formed independently in multiple threads of execution, each thread of execution operating on a separate set of pairs of contacting bodies.

In some embodiments, direct and transposed multiplications are implemented as only one operation to avoid multiple accesses to the same memory locations. Thus, the matrix A is loaded for memory only once during both the direct and transposed multiplications. This technique reduces the number of cache misses and increases overall performance and scalability of the solver.

With each block size of 6×K, an additional K vector, the vector of length K of indices, may also be stored in some embodiments. Each index in this vector is a column index for the corresponding column in the 6×K block. The vector may be used since it is a possible case when two adjacent columns in the 6×K packed block are not adjacent columns in the real matrix A.

Storing the additional K vector with integer indices provides some memory overhead, but the packed matrix layout enables the use of largely full width multiplication and addition single instruction multiple data operations, while jointly computing the direct and transposed matrix multiplications with only a small number of gather and scatter instructions, which generally have high costs. Thus, this approach makes it possible to simply use gather-pre-fetch instructions for gathering single instruction multiple data vectors.

Referring to FIG. 2, a computer system 50 may include a graphics processor unit (GPU) 30, including a single instruction multiple data (SIMD) processor 32. The processor 32, in one embodiment, may store a sequence of instructions, depicted in FIG. 1, in a machine readable storage medium 44 to implement the solver pipeline 28. However, the sequence may also be stored in the memory 42 or in any other suitable machine readable storage medium.

While a separate graphics processor unit 30 is depicted in FIG. 2, in some embodiments, a central processing unit 40 for the entire computer system 50 may be used to implement the sequence 28, as another example. The central processing unit 40 that operates the computer system may be one or more processor cores coupled to a logic 38. The logic 38, for example, could be a chipset logic in one embodiment. The logic 38 is coupled to memory 42, which can be any kind of storage, including optical, magnetic, or semiconductor storage.

The graphics processor unit 30 is coupled through a frame buffer 34 to a display 36. The output of the physics solver pipeline 28 may result in a display 36. The display may include images of bodies that collide and result in an image of motion calculated by the solver pipeline 28.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   calculating position force vectors that describe forces applied to a plurality of bodies;
   forming a force vector for pairs of contacting bodies; forming a collision matrix by forming a sparse constrained block matrix whose blocks comprise N×K elements, wherein N is the number of body properties, and K is the number of body properties rounded up to the nearest multiple of a processor Single Instruction Multiple Data register size;
   solving a system of linear equations defined by the collision matrix and the force vector part using a bi-conjugate gradient method;
   updating positions of the plurality of bodies in accordance with a solution to said system of linear equations;
   including determining post-collision movement using a bi-conjugate gradient method while adding dissipative forces to a spring simulation to dissipate energy using single precision arithmetic; and
   displaying the results of a collision between said bodies.

2. The method of claim 1 including associating each body with a set of properties comprising body position, orientation, linear velocity, angular velocity, mass, and inertia tensor.

3. The method of claim 1 including modeling forces applied to bodies as spring forces and energy dissipation forces.

4. The method of claim 1 including calculating position force vectors, calculating a state matrix, solving a system of linear equations, and updating positions are performed independently in multiple threads of execution, each thread of execution operating on a separate set of bodies.

5. The method of claim 1 wherein forming a collision matrix is performed independently in multiple threads of execution, each thread of execution operating on a separate set of pairs of contacting bodies.

6. The method of claim 1, further comprising storing the sparse constrained block matrix in memory as a sequence of non-zero N×K blocks.

7. The method of claim 1, further comprising associating a vector of K indices with each N×K block to map each column of said block to a column of the collision matrix.

8. The method of claim 1 solving a system of linear equations using single instruction multiple data instructions.

9. The method of claim 1 including solving a system of linear equations defined by the collision matrix as the left hand part and the force vector as the right hand part using a bi-conjugate gradient method and updating positions of the plurality of bodies in accordance with a solution to said system of linear equations.

10. The method of claim 1, including implementing direct and transposed multiplication in only one operation.

11. The method of claim 1, including loading the sparse constrained matrix only once during both the direct and transposed multiplications.

12. An apparatus comprising:
a single instruction multiple data processor to form a collision matrix and a force vector for pairs of contacting bodies, wherein forming a collision matrix further comprises forming a sparse constrained block matrix whose blocks comprise N×K elements, solve a system of linear equations defined by the collision matrix part and the force vector using a bi-conjugate gradient method, update positions of the plurality of bodies in accordance with a solution to said system of linear equations;
including determining post-collision movement using a bi-conjugate gradient method while adding dissipative forces to a spring simulation to dissipate energy using single precision arithmetic; and
a storage, coupled to said processor, storing instructions to form a sparse constrained matrix of a physics solver of N×K blocks where K divides integrally into the width of said single instruction multiple data processor whose blocks comprise N×K elements, wherein N is the number of body properties, and K is the number of body properties rounded up to the nearest multiple of processor Single Instruction Multiple Data register size.

13. The apparatus of claim 12 wherein K is an array of floating point numbers containing K elements that equals one cache line of said single instruction multiple data processor.

14. The apparatus of claim 12, said single instruction multiple data processor to process each body in a system of potentially colliding bodies as separate, parallelly analyzed block using a separate thread for each body.

15. The apparatus of claim 14, said single instruction multiple data processor calculating the position force vector and the state Jacobian matrix for each body.

16. The apparatus of claim 12, said single instruction multiple data processor to implement direct and transposed multiplication in only one operation.

17. The apparatus of claim 16, said single instruction multiple data processor to load the sparse constrained matrix only once during both the direct and transposed multiplications.

18. The apparatus of claim 17, said single instruction multiple data processor to store a K vector, the vector of the length K of indices.

19. The apparatus of claim 12 including a frame buffer coupled to the processor, said frame buffer to output a series of frames depicting the effect of a collision between image bodies.

20. The apparatus of claim 12, said storage storing instructions to form the matrix of N×K blocks where K divides integrally into the width of said single instruction multiple data processor.

* * * * *